United States Patent [19]

Glatt et al.

[11] Patent Number: 4,543,906
[45] Date of Patent: Oct. 1, 1985

[54] DEVICE FOR COATING PARTICLES, PARTICULARLY DRUGS IN THE FORM OF PARTICLES, SUCH AS TABLETS

[75] Inventors: Werner Glatt, Binzen; Erwin Grab, Rümmingen, both of Fed. Rep. of Germany

[73] Assignee: Glatt Maschinen- Und Apparatebau AG, Pratteln, Switzerland

[21] Appl. No.: 463,882

[22] PCT Filed: May 21, 1982

[86] PCT No.: PCT/CH82/00071

§ 371 Date: Jan. 21, 1983

§ 102(e) Date: Jan. 21, 1983

[87] PCT Pub. No.: WO82/03972

PCT Pub. Date: Nov. 25, 1982

[30] Foreign Application Priority Data

May 22, 1981 [CH] Switzerland ............... 3346/81
May 22, 1981 [CH] Switzerland ............... 3347/81

[51] Int. Cl.[4] .................. A23G 3/26; B05L 5/00
[52] U.S. Cl. .................. 178/1.7; 118/19; 118/20
[58] Field of Search ........... 118/19, 24, 20, 17, 118/303, 418; 366/188; 34/132–134

[56] References Cited

U.S. PATENT DOCUMENTS

| | | | |
|---|---|---|---|
| 1,122,660 | 12/1914 | Sturjevant | 366/188 |
| 2,710,574 | 6/1955 | Runion | 118/19 X |
| 2,944,512 | 7/1960 | Wilson, Jr. | 118/418 X |
| 3,229,609 | 1/1966 | Larson et al. | 118/19 X |
| 3,357,398 | 12/1967 | Gross | 118/418 |
| 3,573,966 | 2/1968 | Hostetler | 118/19 X |
| 3,601,086 | 8/1971 | Hostetler | 118/19 |
| 3,696,778 | 10/1972 | Moore | 118/19 X |
| 3,834,347 | 9/1974 | Motoyama et al. | 118/19 |
| 3,874,092 | 4/1975 | Huttlin | 118/19 X |
| 3,934,545 | 1/1976 | Schady | 118/418 X |
| 3,960,196 | 6/1976 | Berner | 118/19 X |
| 3,975,995 | 8/1976 | Shuler | 118/19 X |

FOREIGN PATENT DOCUMENTS

| | | |
|---|---|---|
| 232744 | 3/1911 | Fed. Rep. of Germany . |
| 1225035 | 9/1966 | Fed. Rep. of Germany . |
| 2044543 | 3/1971 | Fed. Rep. of Germany . |
| 2212985 | 9/1973 | Fed. Rep. of Germany . |
| 2245265 | 3/1974 | Fed. Rep. of Germany . |
| 2249863 | 4/1974 | Fed. Rep. of Germany . |
| 2805801 | 8/1979 | Fed. Rep. of Germany . |
| 2911462 | 9/1980 | Fed. Rep. of Germany . |
| 2461205 | 1/1981 | France . |
| 54-7747 | 4/1979 | Japan . |
| WO82/03972 | 11/1982 | PCT Int'l Appl. . |
| 489511 | 2/1976 | U.S.S.R. . |

Primary Examiner—John P. McIntosh
Attorney, Agent, or Firm—Fleit, Jacobson, Cohn & Price

[57] ABSTRACT

A particle coating apparatus is provided with a housing containing a drum open at both its ends and comprising a perforated cylindrical mantel. The drum is allowed to rotate and pivots at one of its ends with a bearing. An air transmission shoe having an opening arranged at one of the lower quadrants of the drum. The opening is adjustable and extends along the contour of the drum. The opening directs the gas through the tablets. The drum has a taking opening extending along the entire width of the mantel. The opening may be closed by a hinged pneumatic shutter. The bottom of the housing located under the drum has an opening which may be closed. When the tablets contained in the drum are coated, they may come out under the effect of gravity after the release of the taking opening and of the bottom opening of the housing.

35 Claims, 9 Drawing Figures

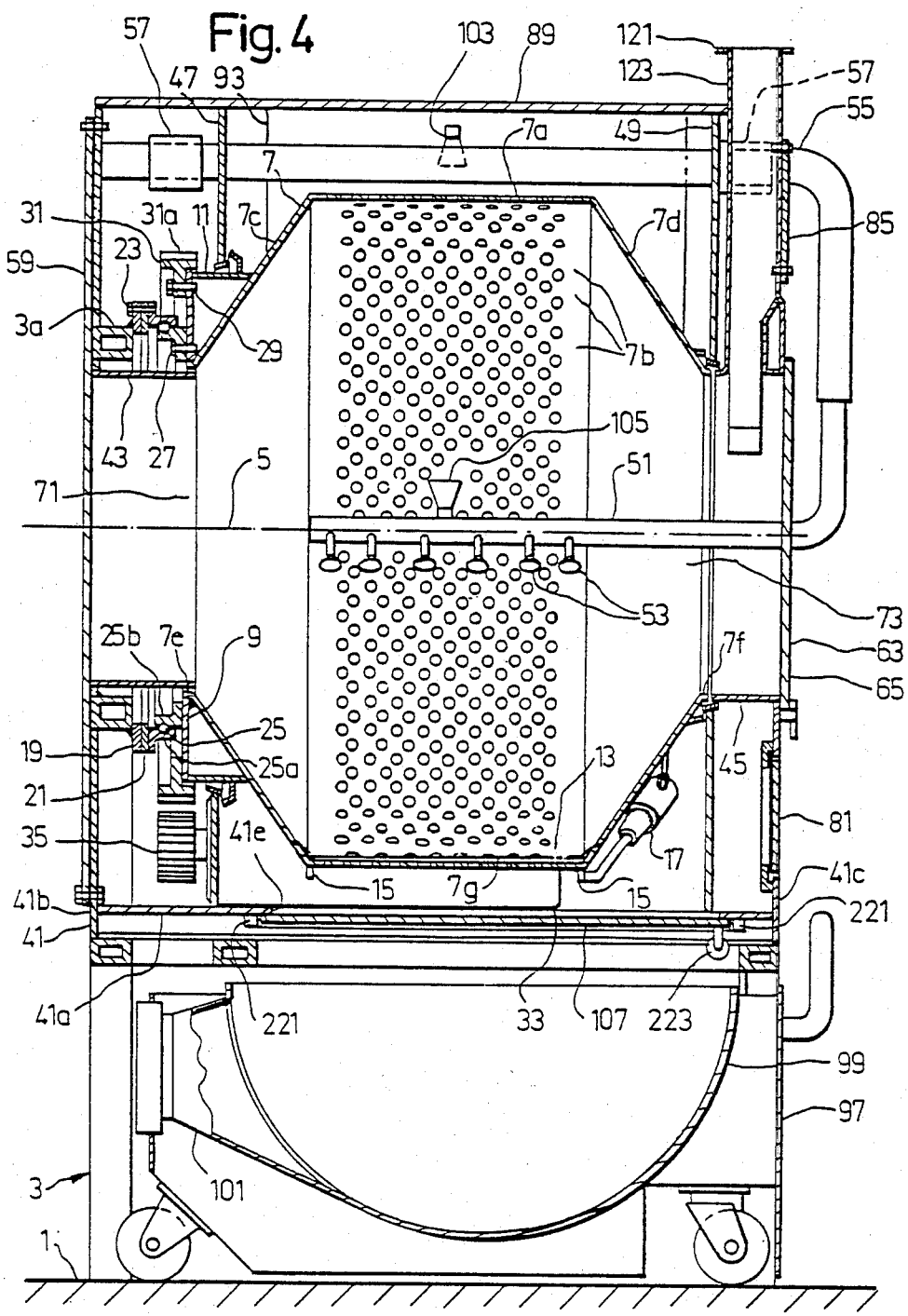

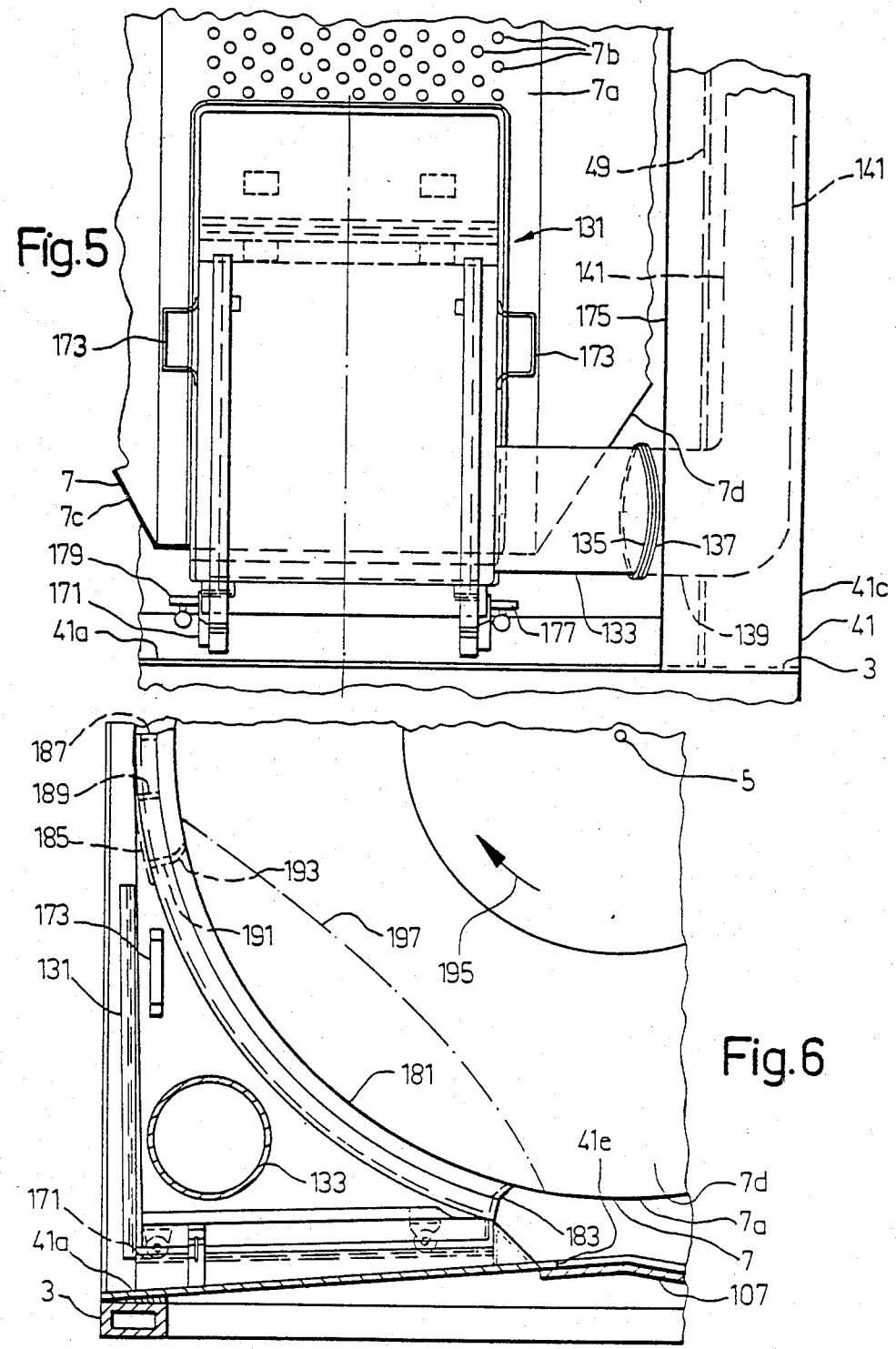

DEVICE FOR COATING PARTICLES, PARTICULARLY DRUGS IN THE FORM OF PARTICLES, SUCH AS TABLETS

BACKGROUND OF THE INVENTION

1. Field of the Invention

The invention is concerned, generally, with a device for coating particles, particularly drugs in the form of particles, such as tablets and similar items. The device has a support, a drum resting in it, in such a way that it may rotate around a pivot or drum axis, said drum having a wall with an—at least, partially—perforated part, and with a gas transmission shoe that, in operation, is held by the support and lies against the aforementioned wall part, so as to make it possible for a gas to flow through it.

As to the concept of "drug particles", we want to state that, by it, solid pharmaceuticals (drugs) or pharmaceuticals that, at least, have a solid covering, i.e. so-called solid forms of administering medicines, such as tablets as well as pills and capsules, are to be understood.

2. Description of the Prior Art

From the U.S. Pat. No. 3,601,086, a device for the coating of tablets is known that comprises a support, a drum that may be rotated around a horizontal axis, and a driving mechanism for rotating the drum. The front side of the drum has been provided with a central opening.

On the opposite side, the drum is closed, connected with the driving mechanism by means of a flange-connected trunnion, and rests in the driving mechanism. The drum has a cylindrical perforated jacket part. In the support, within the region of the one lower quadrant of the drum, a suction shoe is held, in such a way that it may rotate, said suction shoe being capable of being pressed by a compressed-air cylinder by way of a lever system against the perforated jacket part of the drum. The suction shoe is connected with a suction fan, in such a way that, when the device is in operation, air can be sucked out of the interior of the drum through the perforated part of the jacket, the suction shoe, and the duct. The tablets to be coated are fed into the drum through the opening provided in it on the front side and will be removed again from the drum through that same opening after the coating has been applied.

In the devices developed in accordance with U.S. Pat. No. 3,601,086 and known in the market place, a casing enclosing the drum on all sides has been provided. The air is introduced into the casing on top and then sucked into the drum, while a large part of it flows through the perforation in the jacket of the drum. Further, the casing of the device known in the market place has been provided with a door in the region of the opening that is present on one opening in the drum on one of its front sides.

When the drum comes to a standstill, the tablets collect in its bottom part. Therefore, the drum must be raised for removing the tablets, in some way, up to the frontal opening of the drum. Thus, the removal of the tablets is made more difficult. It is also possible that the coatings applied to the tablets may be damaged when the tablets are lifted out of the drum.

The devices, and in particular also the drums, have to be cleaned from time to time,—at least, when the processed product is changed. For proper cleaning, the drums should be scrubbed with a brush, inside and outside. But, in the devices in accordance with the U.S. Pat. No. 3,601,086, the interior of the drum is accessible from one side only, which complicates the cleaning of the drum considerably. That is particularly true in the case of relatively large drums, the measurements of which, taken in the direction of the pivot, may amount to as much as approximately 5 m.

Moreover, the suction shoe can be moved only a relatively short distance away from the drum, which also hampers the cleaning of the outside of the drum and the suction shoe.

Another disadvantage of the devices in accordance with the U.S. Pat. No. 3,601,086 is to be found in the fact that the driving mechanism which is located by the side of the drum and is used to support the drum, also complicates the accessibility of the parts to be cleaned and, moreover, requires a relatively large amount of space, viz. according to the description in the patent, approximately as much space as the drum itself.

When the aforementioned door in the casing is opened for an inspection of the contents of the drum, while a coating is applied to the tablets, frequently a surge of air containing a large part of sprayed coating material passes from the drum into the environment, and that is also a disadvantage.

When a device is used, relatively small and relatively large amounts of tablets are fed into the drum, at various times. In addition, the tablets may have different mobilities, depending on their size, form, and other properties. For those reasons, the coating of the tablets, which is the result of rotation, may have different dimensions, from time to time.

The suction opening of the suction shoe is not described in any detail in the U.S. Pat. No. 3,601,086. In devices that have been developed in accordance with that patent, and which are known in the market place, the suction opening is circumscribed by fixed bounds. When, during the rotation of the drum, a tablet coating is created that, when measured along the circumference of the drum, has relatively large dimensions, air is passed through a relatively small part of that tablet charge only, and the effectiveness of the coating process will be reduced thereby. Conversely, when the tablet coating along the circumference of the drum has relatively small dimensions only and does not extend over the entire opening of the suction shoe, a large part of the air will be sucked through alongside the tablet coating which, as a matter of course, reduces the degree of effectiveness of the device a considerable extent.

Moreover, the device known from the U.S. Pat. No. 3,601,086 provides only for an operation in which the air is sucked out of the drum into the suction shoe. But, it has become evident that that modus operandi has only unsatisfactory results, in the case of certain applications.

From the U.S. Pat. No. 3,834,347, a device for the coating of tablets is known that also presents a drum that may be rotated around a horizontal axis and has a cylindrical mantle. The latter is largely free of holes, and is perforated only at four relatively narrow bands that run parallel to the axis of the drum and are distributed over the circumference of the drum. Each perforated band of the mantle is sealed off from the environment by means of a hood mounted on the outside of the drum. Said hoods form the boundaries of four suction ducts that rotate with the drum during the operation of the device, and that are connected, in a specified rotational position of the drum, with a stationary suction line by way of an indraft coupling mounted on one face of the drum. The mantle has been provided, between two indraft ducts, with an opening for the removal of the tablets that has been provided with a cover which projects toward the outside of the mantle of the drum.

It is true that, in the device in accordance with U.S. Pat. No. 3,834,347, the drum can be emptied with relative ease, after a coating has been applied to the tablets. But, in this device, it is difficult to clean the suction ducts and the indraft couplings, and it is even practically impossible to check up on their being clean. That is a grave disadvantage in the manufacture of pharmaceutical products where high demands are made on purity. According to German Pat. No. 1,225,035, a device is known for the candying of confectionery that has a support and a drum that rotates around a horizontal axis. The drum has been provided with two barrel rings each of which rests on two rubberized friction rollers mounted in the base of the housing. Accordingly, the drum does not have any bearing proper, but is supported solely by the friction rollers. The motor and the gearing for driving the device are housed in the base below the drum. Both faces of the drum have been provided with one opening each. The drum also comprises, within the area of the mantle, another opening, which may be closed by means of a flap, for the removal of the processed material.

In the device known from the German Pat. No. 1,225,035, the mantle of the drum does not present any perforations, and there are no other means for sucking the air through a tablet bed that is present in the drum during operation. But, as a matter of fact, there would be sufficient room between the barrel rings of the drum, the friction rollers, and their shafts which are mounted on top of the base, to house a suction shoe.

SUMMARY OF THE INVENTION

The invention has posed itself the problem to avoid the aforementioned disadvantages of the known devices.

The invention is intended to make it possible, among other things, that the gas can be directed by means of a gas transmission shoe that does not hamper cleaning, through the wall of the drum, and that, nevertheless, the tablets can be removed, in a simple manner, from the drum after a coating has been applied.

In addition, there is the objective of designing the device, in such a way that the drum can be cleaned thoroughly and without any complications.

A further aim consists in keeping the space requirements of the drum as well as for the bearing and driving means used for its support and driving, and the housing that, perhaps, envelops the drum, as small as possible in their outline, in relation to the dimensions of the drum.

Moreover, the device shall make it possible to pass air or, perhaps another gas, through a tablet bed located in the drum, in such a way that an air flow will result that is most favorable for the coating process.

The locking member that is used close the removal opening of the drum, may be free of perforations, or else perforated. In the latter case, the perforation of the drum extends around the pivot or axis of the drum, without any interruption. The closing member of the drum may be constituted by a hinged lid which, e.g., is maintained in its closed position by, at least, one pneumatic adjusting part, as well as swung open and closed by it. Conveniently, the device is provided also with a housing that envelops the drum and seals it off from the environment in a gas-tight way and has a bottom mounted below the drum. This bottom may comprise an opening that, likewise, may be sealed off in a gas-tight manner by means of an, e.g., pneumatically adjustable, perhaps slidable or swingable closing member.

When tablets to which a coating has been applied, are to be removed from the drum, the drum may be stopped during rotation in a position in which the withdrawal opening of the drum and the locking member closing it are on the bottom side of the drum. To phase it more precisely, the drum may be stopped during rotation in a position-and maintained by the driving mechanism in a position in which the withdrawl opening comprises the lowest spot of the drum. When a housing with a bottom comprising a lockable opening exists, the withdrawal opening of the drum and the opening in the bottom of the housing should, furthermore, conveniently overlap, at least partly, in the horizontal projection, while the withdrawal opening of the drum may lie, in plane view, within the opening of the bottom of the housing. Then, the two closing members may be moved into their opening positions, starting from their closed position, while the closing member mounted on the drum may project through the opening that exists in the bottom. Now, the tablets may slide downward and fall out of the drum, due to the force of gravity.

BRIEF DESCRIPTION OF THE DRAWINGS

The object of the invention shall now be described on the basis of an example of the embodiment of the invention, and of variations thereof, as shown in the drawing. In the drawing FIG. 4 shows a somewhat schematic vertical section along the line IV—IV of FIG. 1, but with closed hinged covers and on a larger scale, FIG. 5 affords a view inside the housing, with the hinged cover open, in a horizontal line of vision that is perpendicular to the axis of the drum, with a top-view of the transmission shoe and part of the drum, on a larger scale, FIG. 6 is a top-view of the transmission shoe and part of the drum as seen from the right side of FIG. 5.

DESCRIPTION OF THE PREFERRED EMBODIMENT

Figure 1:
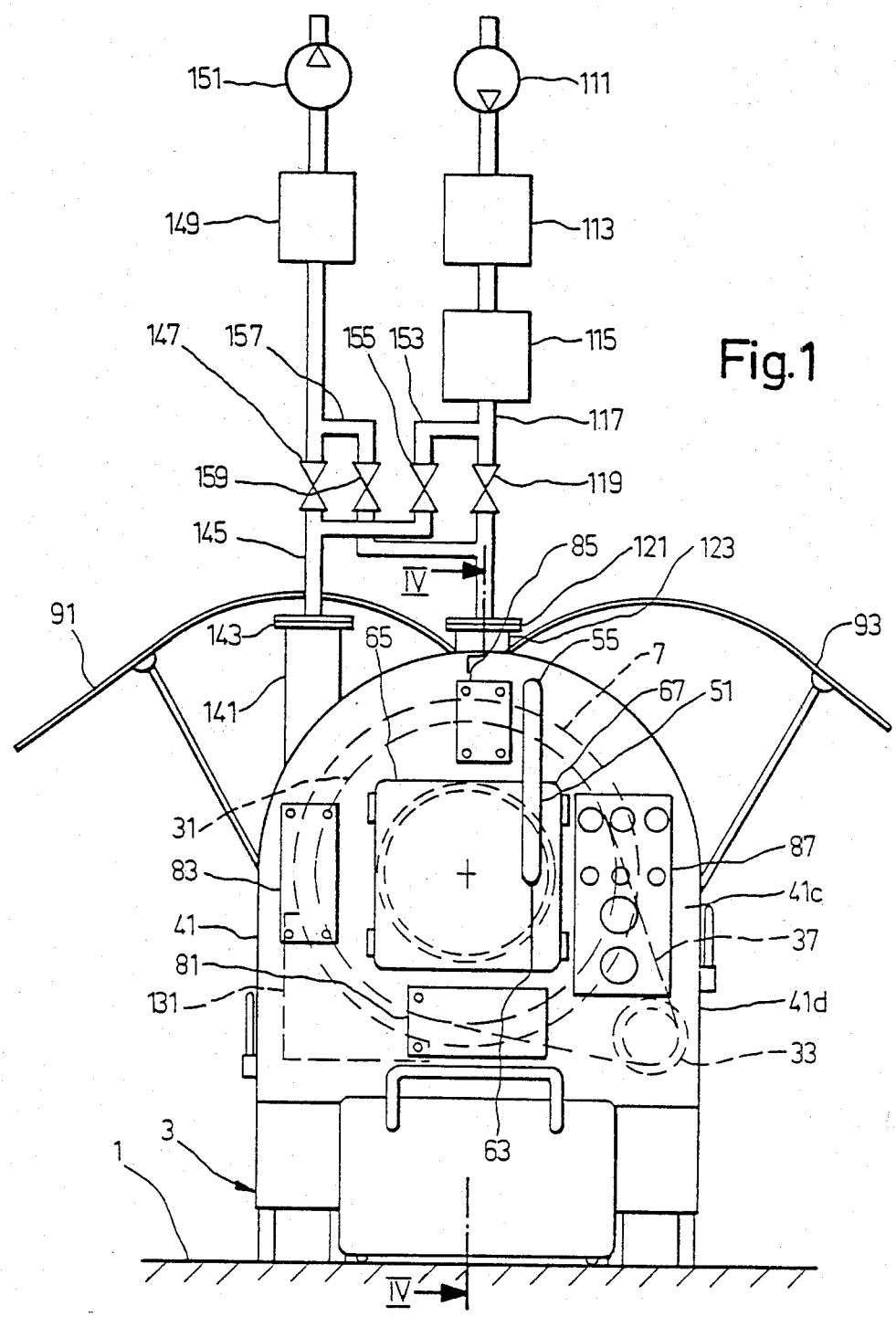
FIG. 1 shows a frontal view of a device for the coating of tablets, while the lateral flap-covers of the housing are opened up.

The device for the coating of tablets as shown in FIGS. 1 to 4 comprises a support 3 that stands on the bottom 1 of a space and consists, at least in part, of bars welded together. In the support 3, a drum 7 is pivoted on a horizontal axis 5.

The wall of the drum 7 which is largely axially symmetrical with the drum axis 5, presents a circular-cylindrical mantle part 7a in its central part. That mantle part 7a has been provided as may be seen in FIG. 4 with a perforation consisting of holes 7b, viz. bore-holes; the holes 7b have been drawn in exaggerated size, for the sake of clarification. The perforation-holes 7b are distributed evenly over the circumference of the circular-cylindrical mantle-part 7a. On the other hand, the perforations do not extend over the entire dimensions of the circular-cylindrical mantle-part 7a, as measured parallel to the drum axis 5, so that said mantle-part 7a comprises, in addition, a non-perforated annular area on both sides of the perforation. The circular-cylindrical part 7a is joined, on both sides, to a conically tapering, non-perforated wall part 7c and 7d, respectively. The thinner ends of the conical drum-wall-parts 7c and 7d are joined to a small cylindrical rim 7e and 7f, respectively. A ring 9 that projects radially away from the rim 7e, is rigidly mounted, viz. welded, on said rim 7e. The outer edge of said ring 9 is connected, additionally, by a cylindrical part 11 with the wall part 7c, while the ring 11 is also secured by means of the welded joints.

The mantle part 7a has been provided with a removal opening 7g for the removal of the tablets. That opening 7g extends over the entire dimensions—as measured parallel to the pivot or drum axis 5—of the mantle part 7a into the wall parts 7c, 7d and may be closed off by a shutter member 13, which is hinged to the drum by means of joints 15, so that it may be able to rotate around an independent axis that is parallel to the drum axis 5. The shutter member 13 is, e.g., also perforated, and in the closed position, its outer surface changes over into the outer surface of the remaining mantle part 7a, smoothly and steadily, if one disregards the hinge joints at the edges of the mantle part 7a. It will be explained below in greater detail how the shutter member 13 may optionally be kept in the closed position or opened, by means of a pneumatic actuator 17 which is mounted on the drum. Besides, scoops attached to the drum 7 (not shown) and designed to take the tablets along may be present in its interior.

The support 3 comprises, among other things, a yoke 3a which is to be found on the left side of FIG. 4, and the top part of which constitutets a vertically disposed square frame. A ring 19 is fastened rigidly, i.e. welded on support 3. On it, the one ring 25a of bearing 25 is fastened by means of screws 23, detachably and rigidly, while a spacer ring 21 is mounted between the ring 19 and the bearing ring 25a. The ring 25b which may be rotated in relation to the ring 25a of the support 25 is fastened by screws 27 on the ring 9, detachably and rigidly. Rolling bodies are mounted between the two bearing rings. Therefore, the bearing 25 has been formed as an anti-friction bearing, e.g. a ball bearing, and is used for the radial as well as axial support of the drum 7. The latter is supported exclusively by the bearing 25 that is located on one side of the cylindrical, perforated mantle part 7a at its one face. Further, the two bearing rings 25a, 25b are sealed off from one another on both sides of the rollers, i.e. balls, by one lip-gasket each (not shown), so that no lubricant may escape from the bearing.

On the outer rim of the ring 9, a toothed ring 31 with a toothing 31a is attached by means of screws 29, rigidly and detachably. A driving mechanism 33, that comprises a pneumatic or electric motor and a gear unit, is fastened onto the support 3, viz. on one side of a vertical plane passing through the pivot 5 of the drum, approximately at the level of the lowest part of the wall of the drum. The driving mechanism 33 comprises a gear wheel 35 which is connected operatively with the toothed ring 31 by way of a toothed belt 37 which has been omitted in FIG. 4. In addition, it should be noted that the rings interconnected by the screws 23, 27, and 29 each may be interconnected not only by the screws but also, in a torsion-resistant manner, by precisely fitting pins.

The device comprises a housing mounted on the support 3, and which, as a whole, has been designated by 41. It consists of a bottom 41a placed somewhat below the drum 7 and the driving mechanism 33, of two end walls 41b, 41c, and of a U-shaped wall part 41d that forms two lateral walls and a curved covering wall changing over into it. The housing 41 seals the drum, located in it, against the environment, in an at least somewhat gas-tight manner. The bottom 41a slopes slightly downward on both sides, from a center line that runs parallel to the drum axis 5. On the two end walls 41b, 41c of the housing, or directly on the support 3, one connecting piece each, 43 and 45 respectively, is mounted, that is coaxial with the drum axis 5 and has a largely circular-cylindrical shape. The connecting piece 43 is slightly thinner than the opening defined by the interior surface of the edge 7e of the drum and projects into it slightly, with some play. The connecting piece 45 has approximately the same diameter as the edge 7f of the drum and abuts it, more or less. The housing 41 comprises two intermediate walls 47 and 49 that are perpendicular to the drum axis 5 and located in the region of the ring 11 and the site of abutment between the edge 7f and the connecting piece 45, respectively. A large part of the drum 7, in particular its perforated mantle part 7a, is therefore contained within a chamber, of the interior space of the housing, as defined by the two intermediate walls. The two intermediate walls 47, 49 have been provided with openings for the connecting pieces 43 and 45, respectively, while to them, rings are fastened that surround openings of the connecting piece 43 and the aforementioned site of abutment, respectively. To the ring 11 and the wall part 7d of the drum, respectively, rings are fastened, likewise, that overlap the rings which are fastened to the intermediate walls 47 and 49, from the central part of the drum, constituting a labyrinth packing together with them, and closing the openings that exist in the intermediate walls 47, 49, so that they are spray-proof. Further, the driving mechanism 33 is sealed off, partly by the intermediate wall 47 and partly by a casing (not shown separately) from the chamber of the interior space of the housing between the intermediate walls 47, 49, in a fluid-proof manner. A nozzle-holding pipe 51, on which several spray-nozzles 53 for the atomization of the coating material have been mounted, projects through the connecting piece 45 into the drum 7. The part of the pipe 51 that projects from the housing 41 at the end wall 41c, is bent upward and connected with a similarly bent pipe 55 that is pat of a telescopic extension that is guided, parallel to the pivot 5, above the drum, in slideways 57. The telescopic extension has been provided, on the end wall 41b, with a flange coupling for connecting it with a supply line for the material to be atomized, and it is, besides, extensible in such a way that the nozzle-holding pipe 51 may be pulled out of the drum 7 and the connecting piece 45 completely, for cleaning and maintenance operations.

The end wall 41b has been provided with an opening that may be closed, in an at least somewhat gas-tight manner, by a shutter member 59 that consists of a door that may be rotated and closed, or possibly by a plate that is mounted, so that it may be detached. The shutter member 59, in the closed position as shown in FIG. 4, lies, in particular, somewhat tightly against the connecting piece 43.

In the region of the connecting piece 45, the end wall 41c has been provided with an opening that may be closed by a shutter member 63 that consists of two door-wings 65, 67, which may be secured by bolts. The two door-wings 65, 67 overlap, when they are closed, in the region of the nozzle-holding pipe 51 which is mounted eccentrically, and have been provided with one packed recess each through which said pipe 51 passes.

The edge 7e of the wall of the drum define, on the end-wall of the drum, on the side of the support, together with the connecting piece 43 that projects into it, a circular opening 71 that is centrally located, i.e. coaxial with the axis 5. In addition, the edge 7f of the wall of the drum together with the connecting piece 45 which is in alignment with it, defines, on the end-wall of the drum that faces away from the ball bearings 25, an opening 73 that is coaxial with the axis 5. When the shutter members 59, 63 have been removed or opened, the interior of the drum 7 is accessible through those two openings 71, 73 from the external space surrounding the housing 41. The unobstructed widths, i.e. the diameters of the openings 71, 73 amount to, at least, 25% and preferably to, at least, 40% of the maximum outside diameter of the drum 7, i.e. of the outside diameter of the part 7a of the mantle. Furthermore, the unobstructed widths or diameters of the openings 71, 73 amount to no less than 300 mm, and expediently to no less than 450 mm. The outside diameter of the drum 7 may, e.g., amount to 1250 mm, and the diameters of the openings 71, 73 may then be of the magnitude of 600 mm.

Still other openings are present on the end wall 41c which may be closed tightly by means of cover plates 81, 83, 85 that are mounted detachably by means of screws or snap members. In addition, a control panel 87 with various reading instruments and operating members is mounted on the end wall 41c.

Figure 2:
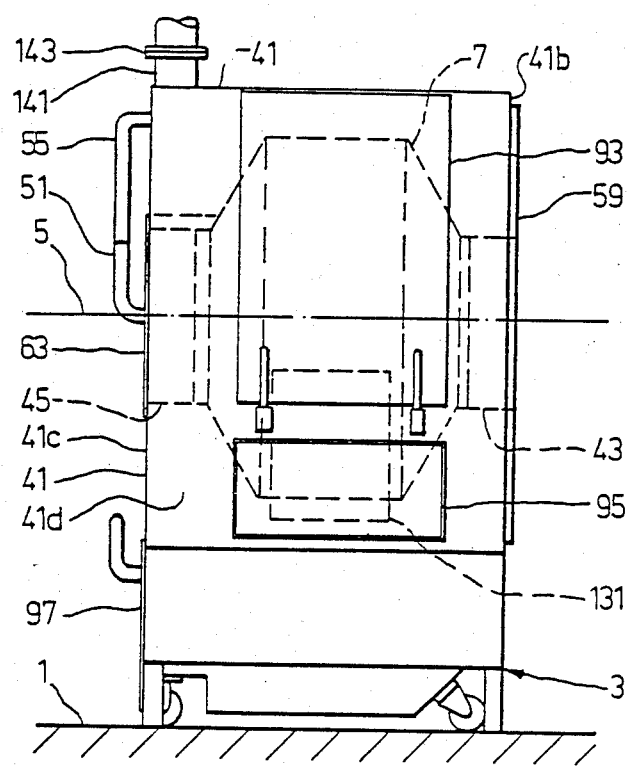
FIG. 2 shows a lateral view of the device on a somewhat smaller scale, while—in contrast to the presentation in FIG. 1—the two flap covers of the housing are closed.
Figure 3:
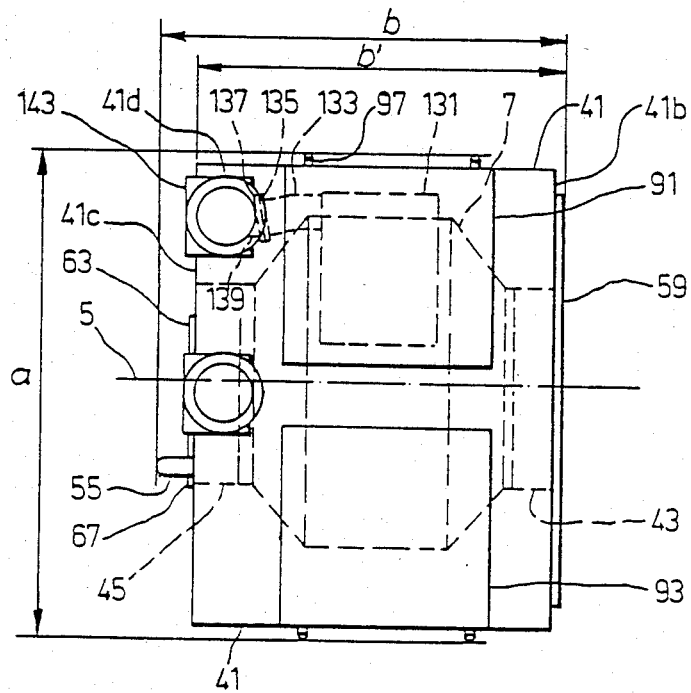
FIG. 3 shows a ground plan of the device on the same scale as FIG. 2, with closed hinged covers.

The top of the housing 41 consists of a metal ledge 89. On it, hinged covers 91, 93 are mounted by means of joints on both sides of the vertical plane passing through the pivot 5. They may be tipped up into the open position as shown in FIG. 2 from a closed position as shown in FIGS. 2 and 3 and in which they are locked and closed openings that are present in the wall part 41d, and may be braced by supports. The wall part 41d has been provided, below the hinged cover 93, with an additional opening that is closed by a detachably mounted cover plate 95.

In the bottom 41a of the housing 41, there is also an opening 41e. This opening may be closed by a shutter member 107 that is shown in FIG. 4, in the closed position, the design of which will be explained in detail below. The support 3 has been developed, in such a way that, between the floor 1 and the bottom 41a of the housing, a space will be left free in which a carriage 97 may be placed that comprises a handle, a bowl- or through-shaped container 99 that is open on the top, and an outlet 101 that is connected with it and may be closed.

In the interior of the housing 41, nozzles for the atomization of water or any other cleaning fluid have been mounted, two of which are shown in FIG. 4 and designated by 103. In addition, at least one nozzle 105 for the atmoization of the cleaning fluid has been mounted in the interior of the drum 7 on the nozzle-holding pipe 51. The nozzles 103, 105 are connected with a supply source of cleaning fluid which comprises a pump, by way of ducts not shown here. A blower 111 that is used to supply air, is connected by way of a filter 113, a heating member 115, and a duct 117 into a which a shutter 119 has been inserted, with the connecting piece 121 of a duct 123 that discharges from the top of the housing 41 through that housing into the connecting piece 45. A transmission shoe 131 for air or gas has been mounted in the interior of the housing 41, viz. in relation to the pivot in one lower quadrant that is to be found, in FIG. 1, on the left side of the vertical plane passing through the drum axis 5. The transmission shoe 131 is guided, as will be explained in greater detail below, in such a way that it may be slid at a right angle to the drum axis 5. The transmission shoe 131 may be moved manually from its operating position as shown in FIGS. 1 and 3, when it lies tightly against the mantle part 7a of the drum 7, into another extreme position that has been provided for cleaning purposes, and in which it is separated by a gap from the drum 7. The width of the transmission shoe 131 as measured parallel to the drum axis 5 is, at least, equal to the corresponding extent of the perforated segment of the mantle part 7a, while the transmission shoe's dimensions are such that the hinges 15 may pass on both sides of the shoe when the drum is rotating.

A rigid duct segment 133, which is particularly visible in FIGS. 5 and 6, and which is slightly angled and generally follows, more or less, the direction of the drum axis 5, is mounted rigidly on the transmission shoe 131. Its end that faces away from the transmission shoe 131 has been provided with an annular coupling 135 which is mounted on its rigidly. Another annular coupling 137 is mounted rigidly on a rigid duct segment 139, which in turn is mounted rigidly on the housing 41 and, in that way, on the support 3. The duct segment 139 opens into a duct 141 that runs upward perpendicularly, projects from the housing 41 on top, and is there equipped with a connecting link 143. When the transmission shoe 131 is in its operating position, the two annular couplings 135, 137 lie against one another in a plane of contact that runs vertically and, moreover, forms a certain angle with the sliding direction of the transmission shoe, said single expediently amounting to no more than 45°. The plane of contact is placed in such a way that the couplings 135, 137 may be separated by means of a shift of the transmission shoe 131 that is directed away from the drum. Expediently, at least one of the two couplings 135, 137 is equipped with an elastically deformable gasket ring. When the transmission shoe 131 assumes its operating position as shown in FIGS. 1 and 3, the couplings 135, 137 result in a close connection between the duct segments 133 and 139. On the other hand, when the transmission shoe 131 starting from its operating position is shifted outwardly away from the drum, the couplings 135, 137 are separated and, in that way, the transmission shoe is uncoupled gaseously from the duct segment 139.

In addition, it may be noted that detachable tentering means or means for applying tension may be provided, in order to overlap the two couplings 135, 137 in the operating position and to pull them against one another. The tentering means would, in this case, be designed, in such a way that they can be removed by means of a few manipulations, e.g. by the swing of a lever, from a position of tension in which the couplings 135, 137 pull against one another, into a position of release in which the coupling may be separated by sliding the transmission shoe.

The connecting link 143 is connected with a suction blower 151 by way of a duct 145, in which a shutter member 147 is inserted, and of a filter 149. The ducts 117 and 145 are interconnected by ducts 153, 157 that bridge the shutter members 119 and 147 crosswise, and in which, likewise, one shutter member each, 155 and 159, respectively has been inserted. The shutter members 119, 147, 155, 159 comprise a passage that may be closed by a ventilating valve. In addition, we wish to point out that the blowers 111, 151, the filters 113, 149, the heating element 115, and the shutter members 119, 147, 155, 159 must not, in constrast to the schematic representation in FIG. 1, be mounted above the housing 41, but may be arranged anywhere, preferably, however, outside the housing 41. We also note that the ducts 153 and 157 together with the shutter members 155, 159 may be omitted whereby, then, the shutter members 119 and 147 that are inserted in the ducts 117 and 145, become unnecessary. Now, we shall described the design of the air or gas transmission shoe 131 in greater detail, on the basis of FIGS. 5 and 6.

On the upper side of the bottom 41a which is mounted on a horizontal frame of the support 3, a guideway 171 has been mounted that is designed, e.g., in the way of a drawer pull-out and has guide rails that are mounted on the housing 41 or directly on the support 3, that run perpendicularly to the axis of the drum and are either disposed horizontally or slightly inclined upward or downward in relation to a horizontal plane, a way from the drum. On those rails, a sliding carriage is guided slidingly by means of rollers or sliding planes; said carriage comprises, in turn, tracks on which, once more, the transmission shoe 131 is guided slidingly by means of rollers or sliding planes. The latter has been provided with handles 173 that may be grasped from the outside through the opening 175 in the housing 41, when the hinged cover 91 is open. Thereby, the transmission shoe 131 may be shifted, in the manner mentioned above, from its operating position as shown in FIGS. 1, 3, as well as 5 and 6, out of the operating position away from the drum to a detent into its other extreme position for cleaning which has also been mentioned before. In addition, manually operable blocking members 177, 179 are present that, e.g., comprise a spring-loaded bolt that engages automatically and is again manually detachable, or a latch that is, perhaps, mounted on the transmission shoe and may be moved to and fro manually, and by means of which the sliding carriage and/or the transmission shoe 131 can be halted, at least in the operating position and, possibly, in the extreme position for cleaning also. The sliding path between the two extreme positions amounts to no less than 30 cm and, e.g., 50 cm, so that an appropriately large gap between the drum 7 and the transmission shoe will result in the extreme position for cleaning. The transmission shoe 131 may be lifted off the sliding carriage in the extreme cleaning position and may be separated completely from the rest of the device.

The transmission shoe 131 is largely designed as a hollow box, whose side that faces the drum part 7a of the drum 7 in the operating position, has a form that is coaxial with the pivot of the drum. The transmission shoe 131 is open in the region of its side facing the drum, or has, to express it differently, on that side an opening which is connected with its cavity. That opening is defined on two sides that face away from one another, by one packing 181 each that forms an arc or circle that is coaxial with the axis of the drum. In the operating position, each of the two packings 181 lies against a nonperforated marginal section of the mantle part 7a. At the other end of the opening, it is bound by a packing 183 that runs parallel to the axis of the drum. A curved plate 185 that is coaxial with the axis of the drum, is inserted into the upper part of the transmission shoe 131. Its upper edge as well as its two lateral edges are conected gas-tight with the wall of the transmission shoe. On the side of the plate 185 that faces the drum 7, three packing retainers 187, 189, 191 are mounted. They are staggered in relation to one another on a circular arch taking its course around the drum axis 5 of the drum and, otherwise, have the form of U-shaped grooves that are open toward the drum. A packing 193 may be placed optionallay in one of those packing retainers, e.g., as shown in FIG. 6, into the bottom packing retainer 191. That packing 193 which runs parallel to the axis 5, and may be displaced, forms the upper limit of the opening of the transmission shoe, is deformable like the other packings 181, 183, lamellar, as well as equipped with a lip turned toward the drum, and in the operating position of the transmission shoe 131, it lies closely against the drum, exactly like the other packings 181, 183. In addition, the ends of the four packings 181, 183, 193 meet very closely, while the packings 181, 183 may be continuous, so that, therefore, the interior of the transmission shoe, in its operating position, is connected with the drum by way of the opening, in an at least somewhat gas-tight manner.

Figure 7:
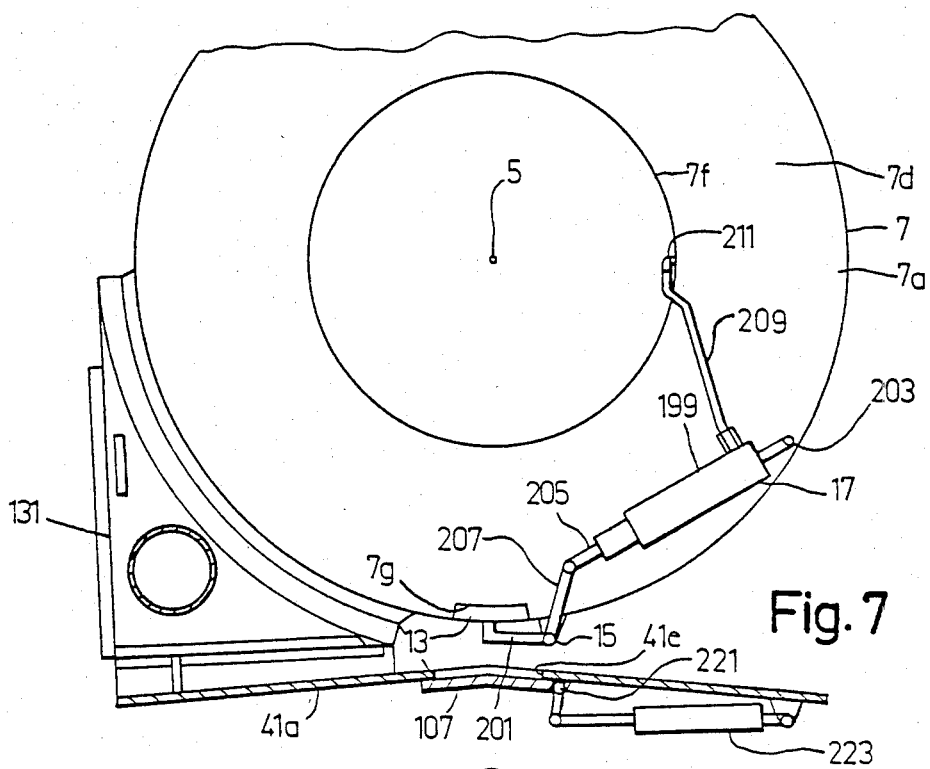
FIG. 7 shows a cut-away portion of the device with a top-view of one face of the drum and of the pneumatic adjusting member mounted on that face, while the withdrawal-opening of the drum and the opening of the—still indicated—bottom of the housing are closed.
Figure 8:
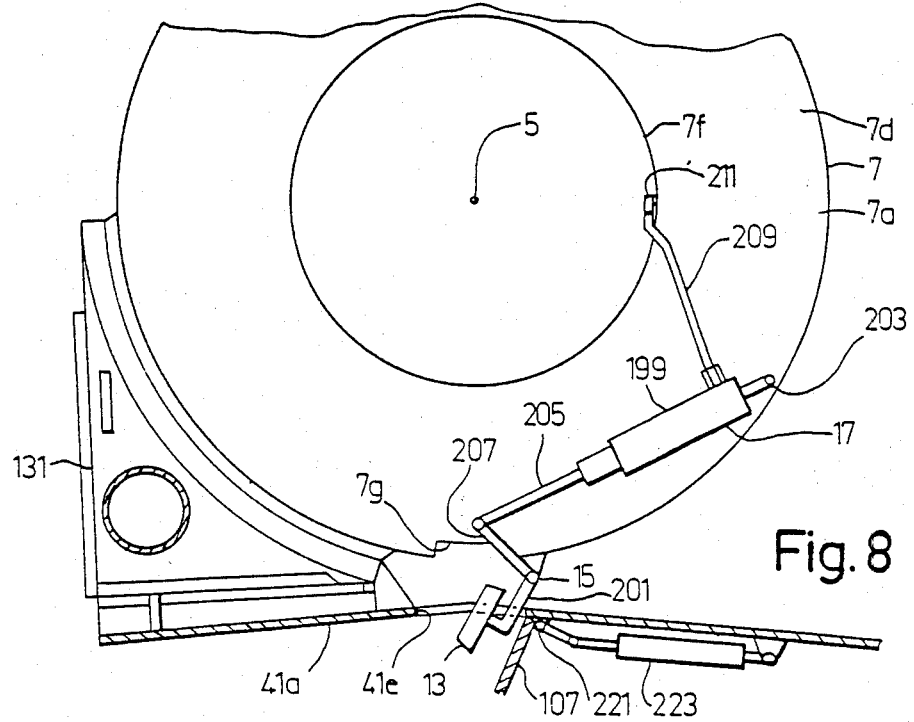
FIG. 8 shows a cut-away portion that is identical with FIG. 7, while, in contrast thereto, the withdrawal opening of the drum and the opening of the bottom of the housing are open.

On the basis of FIGS. 7 and 8, we shall explain the design of the shutter members 13 and 107 and the means for their actuation in greater detail.

The two hinges 15 are mounted on different sides of the perforation of the part 7a of the mantle outside said perforation and, e.g., fastened on the two non-perforated marginal strips of the part 7a of the mantle, while the axis of rotation of the hinges is located on the outside of the wall part 7a. The shutter element 13 is supported on both its ends on the hinges by means of one toggle lever each. The pneumatic actuator 17 comprises a cylinder 199 one end of which is articulated by a joint 203 with the conical wall part 7d of the drum 7, while the axis of rotation of the joint 203 like the one of the hinges 15 runs parallel to the axis 5 of the drum. In the cylinder 199, a piston 205 is guided, the body of which is connected by way of a crank arm 207 with the bolt of the pertinent hinge 15 which bolt itself is connected with the toggle lever 201 in a torsion-resistant manner.

In addition, the cylinder 199 comprises a compression spring that acts on the piston 205 and presses the piston, when the cylinder is free of compressed air, against that extreme position in which it maintains the shutter member 13 in its closed position as shown in FIGS. 4 and 7. If need be, a packing may be provided that seals the shutter member 13, in the closed position, off the mantle part 7a.

The compressed-air connection of the cylinder 199 is connected with a compressed-air line 209, the main part of which takes its course along the exterior of the wall part 7d, and the end of which that faces away from the pneumatic cylinder, is guided at the edge 7f on its interior side and comprises a compressed-air coupling 211. A stationary compressed-air source (not shown) is connected by, at least, one valve that is mounted on the control panel 87 or may be actuated by it, and by a compressed air-line that is retained, at least, partly by the support 3 or the housing 41, with another compressed-air coupling. When the drum 7 rotates, the coupling 211 is retained by a mounting on the drum 7 or on the housing 41. One of the two couplings may be detached from the mounting—or at least adjusted—manually, so that the two couplings may be connected detachably, when the drum 7 is in the rotational position as shown in FIGS. 4, 7, and 8, and when the wings of the doors 65,67 are open. When the two couplings are interconnected, the cylinder 199 of the actuator 17 may admit compressed air by actuating a valve, whereby the shutter member 13, starting from its closed position in a downward direction, is rotated into its release position as shown in FIG. 8 and remains in it until the cylinder is ventilated.

The shutter member 13 can, consequently, be opened only when the two compressed-air couplings are interconnected. Moreover, the electric-pneumatic control mechanism of the device conveniently is equipped with switching means that ensure that the driving mechanism 33 of the drum can be put to work only when the shutter element 13 is in its closed position and the aforementioned couplings are separated. Those switching means may comprise, e.g., a limit switch that is incorporated in the coupling that may be connected with the coupling 211, and that changes its switching state when the two couplings are connected and controls an electric relay or a valve, so that the power supply to the electric or pneumatic motor of the driving mechanism 33 will be interrupted.

In addition, a switching relay for stopping the drum which is arranged on the control panel 87 in an expedient way and is actuated manually, and further means of control are present that make it possible to stop the rotating drum by the actuation of the switching relay in the rotational position as shown in FIGS. 4, 7, and 8. In that rotational position that has been provided for the emptying of the drum, i,e. for the withdrawal of the tablets, the withdrawal opening 7g and the shutter member 13 are located at the lowest point of the drum 7, or to put it more precisely, of the mantle part 7a. In the rotational withdrawal position, as drawn in FIGS. 7 and 8, the withdrawal opening 7g may be symmetrical to a vertical plane through the pivot of the drum. But, the withdrawal opening should not project into the region of the gas transmission shoe 131 and, for that reason, may be arranged somewhat symmetrically to said vertical plane, in the rotational position for withdrawal, depending on the extent of the gas transmission shoe, and may be displaced toward the lower quadrant of the drum that is facing away from the transmission shoe 131. But, in the rotational position for withdrawal, the withdrawal opening 7g should expediently form or envelop the lowest spot of the mantle part 7a.

When the drum 7 assumes its rotational position for withdrawal, the opening 41e of the bottom 41a of the housing is located, at least partly, below the withdrawal opening 7g of the drum 7. Expediently, the opening 41e has a design of larger dimensions than the withdrawal opening 7g, so that the vertical projection of the opening 41e envelops the latter on all sides.

The shutter member 107 which is used to close the opening 41g of the bottom 41a may be designed, e.g., as a lid that is hinged on joints 221, so that it may be swung around an axis that is parallel to the axis 5 of the drum. For the opening and closing of the shutter member 107, at least one pneumatic actuator 223 has been provided that comprises a cylinder mounted on the underside of the bottom 41a and a piston that is connected with the shuttr member 107 by way of a hinge connection. Conveniently, the bottom 41a or, perhaps, the shutter member 107, is equipped with a packing, so that the opening 41e will be closed in a fluid-tight manner, when the shutter element 107 is in its closed position as shown in FIGS. 4, 6, and 7. When it is opened, the shutter member 107 is swung in a downward direction into its release position as shown in FIG. 8. When the shutter member 13 is also in its release position, it may, under certain circumstances, project partly through the opening 41g.

We shall now explain the operation of the device. First, a charge of tablets to be coated is fed into the drum 7 through one of the openings 71 or 73. Then, the opening in question will be closed again, and the drum 7 will be rotated by means of the driving mechanism 33 in the direction of the arrow 195 as drawn in FIG. 6. The charge of tablets will be moved by the rotational movement of the drum 7 into that quadrant of the drum 7, where the transmission shoe 131 is mounted. The charge or layer of tablets may then be limited, e.g., by the contact surface 197 as shown by a dot-dash line in FIG. 6. When the drum 7 is rotated, a coating material that is either fluid or consists of a suspension, is fed into the drum through the pipes 55 and 51 and sprayed onto the tablets by means of the spraying nozzles 53. Then, filtered and heated air, or possibly a protective gas, is blown into the drum 7 by the blower 111, by way of the filter 113, the heating member 115, and the duct 123. The air, or the protective gas, is sucked into the transmission shoe 131, through the charge of tablets and through the holes 7b in the region of the opening of the transmission shoe 131 and flows from it, by way of the duct 141 over the filter 149, to the suction fan 151.

When the coating has been applied to the tablets, the drum 7 will be halted in the rotational position for discharge or withdrawal. Thereupon, the shutter members 13 and 107 may be opened, so that the tablets slide and fall down out of the drum 7 into the container 99 of the carriage 97 through the two openings 7g and 41e and may be transported farther by said carriage.

When the drum is emptied, the tablets that are present in it, will come, at least to a large extent, automatically out of the drum, exclusively because of the force of gravity acting on them. If a residual part should remain adhering to the drum, an operator may push the residual tablets from one of the end walls of the drum to the withdrawal opening, by means of a suitable tool. That means that the withdrawal of the tablets can take place rapidly and in a simple manner.

The two blowers 111 and 151 can be dimensioned, in such a way—and, perhaps adjusted or controlled—that, in the drum 7, atmospheric pressure prevails, approximately, during the coating process. That makes it possible, during the coating process, temporarily to open one of the two shutter members 59 or 63 for a visual inspection without having any considerable amounts of air flow into the drum and without having air and atomized coating material flow out of it.

The adjustability of the packing 193 makes it possible to adapt the circumferential or angular range of the drum by way of which air is sucked from the drum 7 into the transmission shoe 131, to the amount and mobility of the tablets fed into the drum 7. In that way it is possible to achieve that the range of suction, i.e. the effective opening of the transmission shoe, extends over the entire charge of tablets, but not beyond it.

For certain applications, it may be expedient not to suck the gas out of the drum 7 into the transmission shoe 131, but rather to blow the gas out of the latter into the drum and, thereby, to whirl up the tablets, more or less. That may be achieved by closing the valves 119 and 147 which otherwise are open, and opening the valves 155 and 159 which otherwise are closed.

The drum 7, the spraying nozzles 53, the transmission shoe 131, and other parts of the device must be cleaned from time to time, and in particular when the product, i.e. the tablets and/or the coating material, is changed. Cleaning is facilitated by the nozzles 103, 105 by means of which the drum 7 can be sprayed, inside and outside, with water or any other cleaning fluid. The latter may, e.g., while the shutter member 13 is closed, be led off or pumped off by way of a drain that is located at the lowest point of the bottom 41a of the housing, and if need be, a closed circuit may be provided. But, it is possible also to open, during the cleaning, the shutter member 107 which is located in the bottom 41a and to lead the cleaning fluid off into the container 99 of the carriage 97 or into any other container. But, in many cases, the spraying and sprinkling of the drum 7 and of the interior of the housing is not sufficient to achieve satisfactory cleanliness. By opening the shutter members 59 and 63 which preferably are designed as doors, the interior of the drum may be made accessible from both faces of the drum, so that the inner surface of the drum may be scrubbed with a brush. The nozzle-holding pipe 51 may be pulled out of the drum temporarily during the scrubbing. In addition, the partly curved hinged covers 91 and 93 may be opened. In that way, the mantle part 7a is made accessible from both sides and from above, and that makes it possible to scrub the outer surfaces of the drum also. When the hinged cover 91 is opened, it is possible also to move the transmission shoe 131 into the extreme position for cleaning. While the transmission shoe 131 in the operating position is located completely within the housing 41, it is, in its extreme position for cleaning, at least in part and preferably completely, outside the housing 41. Moreover, if need be, it may be lifted completely from the sliding carriage of the guideways 171 which are designed like pull-out drawers, and be separated completely from the support 3 and the housing 41. Consequently, when the transmission shoe 131 is moved back from its extreme position for cleaning into its operating position, the two couplings 135, 137 will automatically return to the position in which they connect the transmission shoe 131 pneumatically with the duct segment 139 that is mechanically connected with the support 3 in a rigid way. The parts to be cleaned may also be made accessible, rapidly and efficiently, by opening and/or removing the shutter members 59, 63 as well as of the hinged covers 91, 93, while the transmission shoe 131 may also be separated rapidly and simply from the drum 7. After cleaning, the transmission shoe 131 may be returned to its operating position, and the hinged covers 91, 93 as well as the shutter members 59, 63 may be closed and bolted, by means of existing holding means or in some other way, in their closed positions.

The bearing 25 and the toothed ring 31 are within a range of space the greatest distance of which from the neighboring edge of the cylindrical mantle part 7a as measured along the pivot 5 amounts to no more than 40%, and e.g. approximately or no more than 30% of the longest outside diameter of the drum, i.e. of the outside diameter of the mantle part 7a. That is helpful in keeping the planimetric dimensions of the main parts of the device, viz. of the support 3, of the drum 7, of the bearing 25 of the driving and gear mechanisms 31, 33, 35, 37 that are used to drive the drum, of the housing 41, and of the transmission shoe 131 in the operating position, relatively small, when compared to the dimensions of the drum, and that is advantageous in regard to the accessibility as well as to the space requirements of the device.

The planimetric dimensions of the aforementioned main parts of the device, i.e. of practically the entire device with the exception of the blowers 111, 151, of the filters 113, 149, of the heating member 115, and of the, not necessarily indispensable, shutter members 119, 147, 155, 159, are accordingly only relatively little larger than the planimetric measurements of the drum 7. The planimetric dimension of the aforementioned principal parts as measured at a right angle to the drum axis 5 of the drum amounts to no more than 1.5 times, viz. e.g., 1.3 times the outside diameter of the drum 7, or to state it more precisely, of the thickest part of the drum. The planimetric dimension b as measured parallel to the pivot 5 of the support and housing of said principal part amounts, moreover, to no more than 2 times and preferably 1.8 times the dimension of the drum measured in the same direction. When only the support proper and the housing are taken into consideration and a few small parts which, as such, are small and project beyond them, in particular the pipes 51 and 55, are disregarded, the ratio of the planimetric support-housing dimensions b' as measured parallel to the pivot to the dimensions of the drum as measured in the same direction may be made equal to or smaller than 1.6 and even approximately equal to or smaller than 1.5. It may be noted in this connection that, if need be, the control panel 87 may also be arranged separately, away from the rest of the device.

Figure 9:
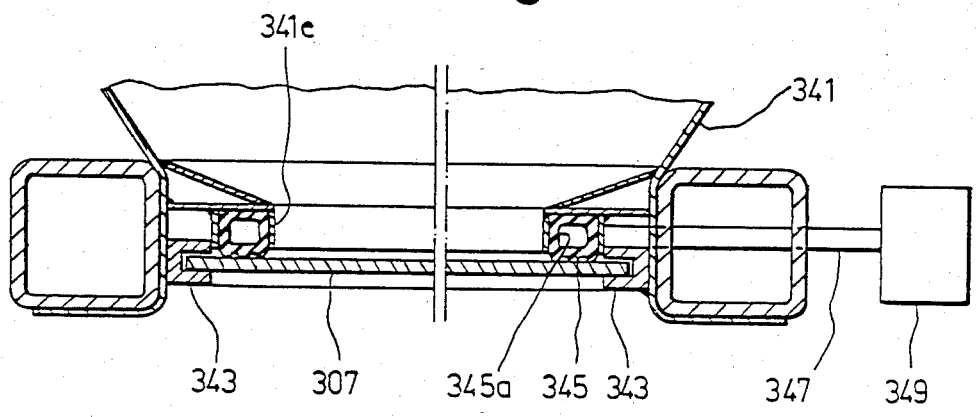
FIG. 9 shows a variant of a closing member for closing the opening of the bottom of the housing.

The device may be modified in various respects. E.g., the bottom of the housing enclosing the drum, as has been indicated in FIG. 9 for the bottom 341, may be designed as a tub. At its lowest point, there is an opening 341e that corresponds to the opening 41e. By means of guideways 34g which are mounted on the bottom or on the support of the device, a shutter member 307 is guided horizontally and, e.g., slidable in parallel to the pivot of the drum. The shutter member 307 may be shifted from its closing position, as shown in FIG. 9, and in which it closes the opening 341e, into a release position in which it frees it. The shutter member 307 that corresponds, as to its purpose to the shutter element 107 may, e.g., be moved with the aid of a pneumatic shutter member that comprises a cylinder which is mounted on the underside of the bottom and a piston connected with the shutter member 307. The cylinder may contain, e.g., a return spring that acts on the piston and maintains the shutter member in the closing position, when the cylinder is pressureless.

The bottom 341 has been provided with means that delimit a groove or notch that runs along the edge of the opening 341e and is open in a downward direction. In that groove, a packing 345 that encloses the opening 341e completely has been inserted. It has a generally rectangular profile as well as a cavity 345a and is elastically deformable, particularly extensible laterally. The cavity 345a is tightly sealed off from the environment and connected fluidly by a duct 347 with a compressed-air control device 349 which has been indicated in a schematic way. Said device comprises means for inflating the packing with compressed air after the shutter member 307 has been closed and for ventilating it before or during the opening of the shutter member 307. When the shutter member 307 is in its closing position and the packing 345 has been inflated, the lips or ribs that are located on the undersides of the latter are pressed against the shutter member and provide a fluid-tight seal of the opening 341e. When the shifting of the shutter member 307 takes place when the air has been removed from the packing 345, it is relatively easy to shift the shutter member.

The shutter member 107 as shown in FIGS. 4, 6, 7, and 8 could be sealed, in the closing position, in a similar manner by means of an inflatable ventable packing. Likewise, inflatable and ventable packings may be provided for sealing the shutter members 59, 63 as well as the hinged covers 91, 93 and, if need be, the cover plates 81, 83, 85, too.

In addition, the drum could be driven, rather than by way of a driving mechanism with a toothed belt, by a driving mechanism with chain wheels and a chain or by way of a driving mechanism with gear wheels engaging one another directly. The bearing used to support the drum and the toothed ring connected rigidly with the drum should, however, be designed and arranged, in such a way that they are located, in a projection that is parallel to the axis of the drum, either outside the means delimiting the central opening in the drum-face in question, or that, in any case, they themselves form at least part of said means of delimitation. When the shutter member 13, as mentioned above, is also perforated, the perforation of the wall part 7a extends, practically without any interruption, along the entire periphery of the drum. The shutter member that is used to close the withdrawal opening of the drum could, however, be free of holes instead of being perforated. In that case, the perforation of the drum would then still be continuous, except for the interruption by the relatively narrow shutter member.

There exists also the possibility of providing one packing each for every packing-holder 187, 189, 191 of the transmission shoe. It will then be possible, for adjusting the extent of the opening of the transmission shoe 131, optionally to place packings in all the holders 187, 189, 191, or not to do so, while in each case, the lowest packing determines the extent of the opening. Furthermore, any other number of holders could be provided instead of the three holders 187, 189, 191. Moreover, it would be possible to replace the packing 193 which may be inserted in various positions, by a packing that would be guided along a circular curve that would be coaxial with the pivot of the drum and continuously adjustable by adjusting means. It would also be possible to render the lower border of the opening of the transmission shoe variable.

Moreover, it would be possible to replace the guideways, in the form of a pull-out drawer, of the transmission shoe by a simple sliding guide. Furthermore, one could do without any guide altogether and fasten the transmission shoe detachably, in its operating position, to the support of the device. In that case, the support could be provided with an overlay that can support and position the transmission shoe in the operating position. In addition, e.g., a locking mechanism may be provided that can be actuated manually, so that the transmission shoe can be disassembled rapidly for cleaning, and then be re-assembled. The rear wall of the transmission that faces away from the drum, could also be equipped with, at least, one opening that may optionally be closed in a gas-tight manner, or opened, by means of a shutter member, e.g. a door. When the transmission shoe is used for the passing-through of air, the door would, of course, be closed, while it could be opened for cleaning. If the transmission shoe is equipped with an opening of that type may be closed, it does not have to be removed for cleaning and may, therefore, be fastened undetachably. Furthermore, one could provide one pair each of adjusting members rather than only one pneumatic actuator 17, 223 each. In addition, one could provide, instead of pneumatic actuators, other actuators operating without muscle power, e.g. hydraulic or electric actuators.

We claim:

1. Apparatus for coating particles, particularly pharmaceuticals, such as tablets, said apparatus comprising:
    a support;
    a drum positioned on said support for rotation about an axis, said drum having a wall at least partly perforated;
    a gas transmission shoe which is held during operation by said support, said shoe lying against said wall part so that gas may flow through said wall; and
    a housing encompassing and sealing said drum, said housing including an opening on both sides of a vertical plane passing through said axis of said drum, a hinged cover for closing off each of said openings, each of said hinged covers mounted for opening and closing around a pivot located on the upper side of each hinged cover, and said transmission shoe being movable away from said drum and outside of said housing.

2. The apparatus of claim 1, further comprising inflatable packings disposed about the periphery of each of said openings, said packings being inflated when said hinged covers are closed to create a seal between said hinged covers and said housing.

3. The apparatus of claim 1, wherein said housing includes a U-shaped wall part forming two lateral walls and a covering wall which limit the size of each of said openings.

4. The apparatus of claim 1, wherein said gas transmission shoe is arranged in the interior of said housing in such a way that it can be moved out of the housing through one of said openings if the hinged cover for closing this opening is opened.

5. The apparatus of claim 4, further comprising a guide means mounted to the support for slidably guiding said gas transmission shoe when said shoe is moved away from said drum or moved towards said drum; and further comprising a blocking member for blocking said gas transmission shoe in its position in which it lies against said wall part of said drum.

6. The apparatus of claim 5, wherein said gas transmission shoe is operatively connected by means of two coupling members to a duct segment rigidly fastened relative to the housing, one of said coupling members being rigidly connected with said gas transmission shoe and the other coupling member being rigidly connected to said duct member, wherein said coupling members are arranged in such a way that they establish a tight connection when said gas transmission shoe is fixed by said blocking member in the position in which it lies against said wall part without tentering means overlapping the two coupling members.

7. The apparatus of claim 1, further comprising plural nozzles arranged outside the drum in the housing and inside the drum, said nozzles adapted for spraying a cleaning fluid against the outer surface and the inner surface of the drum; and further comprising a drain near the lowest part of the inner space of said housing for leading away the cleaning fluid.

8. The apparatus of claiim 1, wherein said housing encompasses said drum gas-tight.

9. Apparatus for coating particles, particularly pharmaceuticals such as tablets, said apparatus comprising:
a support;
a drum positioned on said support for rotation about a rotation axis, said drum having a wall at least partly perforated and a withdrawal opening for the withdrawal of particles;
a gas transmission shoe that, during operation, is held by said support and lies against said wall part, so as to make it possible for a gas to flow through said wall part, said transmission shoe being non-rotatable relative to said rotating axis;
said withdrawal opening being located, at least partly, in said wall part and capable of being closed and re-opened with the aid of a shutter member, said shutter member being swingably connected with said drum, said shutter member rotatable around a swivel axis, said swivel axis running parallel to said axis of said drum;
actuating means for rotating said shutter member, said actuating means not operated by hand; and
holding means for movably connecting said shutter member with said drum in such a way that said shutter member may be moved between a closed position in which it closes the withdrawal opening to an open position in which exposes the withdrawal opening, said shutter member and said holding means secured to and rotatable with said drum such that when said drum is rotated and said shutter member is in said closed position, said shutter member and said holding means may pass by said transmission shoe to a position where said shutter member may be operated in its open position.

10. The apparatus of claim 9, further comprising driving means for driving said drum; and control and power means for controlling and powering both said driving means and said actuating means, said control and power means ensuring that said shutter member can only be opened when said drum is non-rotating and in a position where the withdrawal opening has been rotated to the lowest point of the drum.

11. The apparatus of claim 9, wherein said actuating means comprises at least one pneumatic cylinder, said wall part comprises a generally cylindrical portion which is at least partially perforated, a pair of unperforated wall parts, each originating on either side of said cylindrical portion, each of said wall parts tapering inwardly away from said cylindrical portion; and wherein said apparatus further comprises a housing that encompasses and seals said drum and has a bottom with an opening that may be closed by means of a movable member mounted on said bottom, said opening being positioned below the lowest point of said drum and being located, in a rotational position of said drum, at least partly below the withdrawal opening of the drum; and that said shutter member attached to the drum can be opened at a rotational position of the drum in which position said withdrawal opening encompasses the lowest point of the drum so that the particles present in the drum may leave the drum through the withdrawal opening and the opening in said bottom in a downward direction.

12. The apparatus of claim 11, further comprising second actuating means comprises a pneumatic cylinder for actuating said movable member.

13. The apparatus of claim 11, further comprising means for slidably guiding said movable member mounted to said bottom.

14. The apparatus of claim 11, further comprising an inflatable package for sealing said movable member mounted to said member in its closed position and means for inflating said package when said movable member is closed.

15. The apparatus of claim 11, further comprising second actuating means mounted to said housing for opening and closing said movable member mounted on said bottom.

16. The apparatus of claim 9, wherein said actuating means comprises means mounted to said drum for opening and closing said shutter member.

17. The apparatus of claim 9, wherein said actuating means comprises at least one pneumatic cylinder mounted on said drum.

18. The apparatus of claim 17, wherein said pneumatic cylinder is mounted for opening said shutter member when compressed air is supplied to said cylinder and wherein said actuating means comprises spring means for holding said shutter member in its closed position when said pneumatic cylinder is free of compressed air.

19. The apparatus of claim 17, wherein said pneumatic cylinder is mounted outside of said drum on one of said unperforated, tapered wall parts.

20. Apparatus for the coating of particles, particularly pharmaceuticals such as tablets, said apparatus comprising;
a support;
a drum resting on said support with the aid of bearing means in such a way that said drum may rotate around a horizontal axis, said drum having been provided with a perforated mantle part and first and second opposed faces;
driving means for rotating said drum;
a gas transmission shoe to enable a gas to flow through said perforated mantle part;
said drum further comprising on at least one of its first and second faces an opening through which the interior of the drum is accessible and that, on one side of said perforated mantle part, a bearing exists, with two rings that encompass said axis and may be rotated in relation to one another, and one of which is connected rigidly with said support and the other of which is rigidly connected with said drum;

said drum being supported exclusively on said one side of said perforated mantle part;

said bearing being an antifriction bearing that, for driving the drum on one side of the perforated mantle part, is a toothed ring rigidly fastened to the drum, said toothed ring being operatively connected to a cogwheel that is mounted on the support in such a way that said cogwheel may be rotated in a projection that is parallel to said axis of the drum; and further comprising a housing that encloses and seals said drum on top and on all sides that comprises, in the area of the at least one drum opening in the face of the drum, a wall opening that may be closed and opened by means of a shutter member.

21. The apparatus of claim 20, wherein said toothed ring and said cogwheel are connected by a toothed belt.

22. The apparatus of claim 20, wherein said bearing and said toothed ring are so close to said perforated mantle part, that said drum, all the bearing and driving means used for supporting and driving said drum, and said transmission shoe find room in a planimetric area, the dimension of which as measured at a right angle to the drum axis amounts to no more than 1.5 times the largest outside diameter of said drum, and the dimension of which as measured parallel to the drum axis amounts to no more than 1.6 times the dimension of said drum as measured parallel to the drum axis.

23. The apparatus of claim 20, wherein said drum comprises on each end of said perforated, generally cylindrical mantle part, a tapered unperforated wall part, and wherein said rings of said bearing and said toothed ring are, in a section along said drum axis, arranged beside one of said tapered wall parts.

24. The apparatus of claim 20, wherein said rings of said bearing and said toothed ring are arranged on the same side of said perforated mantle part and wherein said apparatus further comprises air conveying means; and duct means connecting said gas transmission shoe with said air conveying means, said duct means being arranged on that side of said perforated mantle part opposite to said rings.

25. The apparatus of clam 20, wherein one of said drum openings is opposite said rings and wherein said apparatus further comprises air conveying means; and duct means for connecting the one of said drum openings that is opposite said rings with said air conveying means so that air enters and leaves the drum at least predominantly only through said drum opening and through that portion of the perforated mantle part that is covered by said gas transmission shoe.

26. The apparatus of claim 20, wherein said housing comprises an intermediate wall separating and making at least spray proof that portion of the inside of the housing that comprises said perforated mantle part and said gas transmission shoe from a portion of the inside of the housing comprising said rings.

27. The apparatus of claim 20, wherein the inside diameter of said unique bearing is at least 25% of the maximum diameter of the drum.

28. The apparatus of claim 20, wherein said drum comprises an opening on each of said first and second faces.

29. The apparatus of claim 28, wherein the inside diameters of the openings present in the two faces amount to, at least, 25% of the maximum outside diameter of the drum.

30. The apparatus of claim 28, wherein the inside diameters of said openings present in the two faces are at least 300 mm.

31. Apparatus for the coating of particles, particularly pharmaceuticals such as tablets, said apparatus comprising;

a support;

a drum with opposed faces, said drum resting on said support, with the aid of bearing means, in such a way that said drum may rotate around a horizontal axis, said drum having been provided with an opening in the central part of one of its faces and with a perforated mantle part;

driving means for rotating said drum;

a gas transmission shoe, secured to said support and non-rotatable relative to said horizontal axis, to enable a gas to flow through the perforated mantle part;

heating means for heating the gas that flows into said drum; and gas conveying means for leading the gas through said opening and into said drum, said gas conveying means also for causing at least the major portion of the gas entering said drum to leave said drum by passing through that portion of the perforated mantle part that is momentarily covered by said gas transmission shoe.

32. The apparatus of claim 31, wherein said gas conveying means comprise blowing means and connecting means to lead an air flow produced by said blowing means and heated by said heating means to said opening of said drum.

33. The apparatus of claim 31, further comprising a housing encompassing said drum; and wherein said gas conveying means comprises a connecting piece arranged between said drum and an end wall of said housing and abutting at least approximately the edge portion of said drum limiting said opening of the drum and wherein said housing comprises an opening at the mouth of said connecting piece being closable by a shutter member.

34. The apparatus of claim 31, further comprising:
blowing means;
sucking means; and
connecting means for alternatively connecting said blowing means with said opening of said drum and said sucking means with said gas transmission shoe or visa versa.

35. The apparatus according to claim 34, wherein said connecting means comprises valve means for establishing said alternative connections.

* * * * *